United States Patent
Yang et al.

(10) Patent No.: US 9,416,064 B2
(45) Date of Patent: Aug. 16, 2016

(54) METHOD FOR PRODUCING CONTROLLED-RELEASE FERTILIZER COATED WITH POLYURETHANE

(71) Applicant: Chinese Academy of Agricultural Sciences Institute of Agricultural Resources and Regional Planning, Beijing (CN)

(72) Inventors: Xiangdong Yang, Beijing (CN); Bingqiang Zhao, Beijing (CN); Yanting Li, Beijing (CN); Juan Li, Beijing (CN); Zhian Lin, Beijing (CN); Liang Yuan, Beijing (CN)

(73) Assignee: CHINESE ACADEMY OF AGRICULTURAL SCIENCES INSTITUTE OF AGRICULTURAL RESOURCES AND REGIONAL PLANNING, Beijing (CN)

( * ) Notice: Subject to any disclaimer, the term of this patent is extended or adjusted under 35 U.S.C. 154(b) by 0 days.

(21) Appl. No.: 14/453,362

(22) Filed: Aug. 6, 2014

(65) Prior Publication Data
US 2015/0040630 A1  Feb. 12, 2015

(30) Foreign Application Priority Data

Aug. 7, 2013  (CN) .......................... 2013 1 0342031
Aug. 7, 2013  (CN) .......................... 2013 1 0342033
Aug. 7, 2013  (CN) .......................... 2013 1 0342339

(51) Int. Cl.
C05G 3/00  (2006.01)
(52) U.S. Cl.
CPC ................... C05G 3/0029 (2013.01)
(58) Field of Classification Search
None
See application file for complete search history.

(56) References Cited

U.S. PATENT DOCUMENTS

| | | | |
|---|---|---|---|
| 4,711,659 A | 12/1987 | Moore et al. | |
| 4,804,403 A | 2/1989 | Moore et al. | |
| 5,538,531 A | 7/1996 | Hudson et al. | |
| 5,645,624 A * | 7/1997 | Naka et al. | 71/64.07 |
| 5,803,946 A * | 9/1998 | Petcavich et al. | 71/28 |
| 6,231,633 B1 | 5/2001 | Hirano et al. | |
| 6,391,454 B1 * | 5/2002 | Mao et al. | 428/407 |
| 9,163,110 B2 * | 10/2015 | Watanabe | C05G 3/0029 |
| 2004/0016276 A1 * | 1/2004 | Wynnyk | C05G 3/0023 |
| | | | 71/64.11 |
| 2004/0020254 A1 * | 2/2004 | Wynnyk et al. | 71/64.11 |

(Continued)

FOREIGN PATENT DOCUMENTS

| | | | |
|---|---|---|---|
| CN | 101357872 | * | 2/2009 |
| CN | 101648837 A | | 2/2010 |

(Continued)

OTHER PUBLICATIONS

Li Qingshan et al, "Synthesis and Performance of Polyurethane Coated Urea as Slow/controlled Release Fertilizer", Jounal of Wuhan University of Technology—Mater. Sci. Ed., vol. 27 No. 1 (Feb. 2012).*

Primary Examiner — Wayne Langel
(74) Attorney, Agent, or Firm — Christopher J. Knors; Moore & Van Allen PLLC

(57) ABSTRACT

A method for producing controlled-release fertilizer coated with polyurethane is provided, wherein granular fertilizer is preheated under fluidized state in a fluidized bed; the surface of the granular fertilizer is pretreated after liquid paraffin being atomized; polyol and isocyanate are mixed in a nozzle, then atomized and sprayed onto the surface of the granular fertilizer; after the reaction materials are added, liquid paraffin is added for surface release treatment.

13 Claims, 1 Drawing Sheet

(56) References Cited

U.S. PATENT DOCUMENTS

2005/0076687 A1* 4/2005 Whittington ................ 71/64.07
2010/0326152 A1* 12/2010 Mente ............................... 71/27
2014/0298873 A1* 10/2014 Garg et al. ........................ 71/28
2014/0331727 A1* 11/2014 Hargrove et al. ................. 71/28
2016/0031765 A1* 2/2016 Watkins ............... C05G 3/0029
　　　　　　　　　　　　　　　　　　　　　　　　71/28

FOREIGN PATENT DOCUMENTS

| CN | 101759497 | * | 6/2010 |
| CN | 102199046 B | | 9/2011 |
| CN | 102701832 B | | 10/2012 |
| CN | 102964186 | * | 3/2013 |
| JP | 2011-16696 | * | 1/2011 |
| JP | 2011-16697 | * | 1/2011 |

* cited by examiner

METHOD FOR PRODUCING CONTROLLED-RELEASE FERTILIZER COATED WITH POLYURETHANE

CROSS-REFERENCE TO RELATED APPLICATIONS

This application claims the priority to Chinese Patent Application No. 201310342031.0, filed Aug. 7, 2013, Chinese Patent Application No. 201310342033.X, filed on Aug. 7, 2013, and Chinese Patent Application No. 201310342339.5, filed Aug. 7, 2013, the contents of which are hereby incorporated by reference in their entirety.

TECHNICAL FIELD

The present invention relates to a method for producing controlled-release fertilizer coated with polyurethane. In the method, the reaction materials can be continuously distributed onto the surface of the particles in a fluidized state, thereby promoting the polyurethane reaction to complete rapidly, making the mixing, coating, reacting and solidifying process of the reaction materials carried out uniformly and rapidly, effectively preventing the adhesion between the particles and solving the issues such as the one that the large granular fertilizers easily adhere and consequently destroy the controlled releasing performance of the film. With this method, the polyol and isocyanate can be continuously atomized onto the surface of the fertilizer particles to prepare the coated fertilizer with controlled releasing performance. This method is mainly used in coating operation of polyurethane reaction for film formation, especially suitable for continuous production of coated controlled-release fertilizer.

BACKGROUND ART

Controlled-release fertilizer coated with polyurethane is prepared from the direct reaction of the reactants of polyol and isocyanate etc. on the surface of the fertilizer particles. Beside the raw materials formulation of the polyurethane reaction, it will also be affected by controlling technology of the process including spray coating for film formation and particle fluidization etc.

At present, mainly the castor oil polyol and isocyanate are used as the reactants. According to the reaction stoichiometry, the reactants will be added directly onto the surface of the circularly rolling fertilizer particles for reaction and film forming to prepare the controlled-release fertilizer. Early in 1986 William P. Moore et al. in the United States had used the rotating drum to make MDI and polyester polyols react on the surface of the sulfur coated urea to prepare the polyurethane film. The invention uses laboratory rotating drum coating device with a diameter of 24 inches and a length of 10 inches for coating operation, wherein, in the rotating drum, 15 shoveling plates are disposed to assist particles rolling, the rotating speed of the drum is 30 rpm, temperature is 110° C., and 4 kg sulfur coated urea is added for once. During coating, 1.0% isocyanate is firstly sprayed into the drum, after 2 minutes of rolling, 1.5% polyol is added and then rolling is allowed for two minutes, which is repeated several times. Triethanolamine or melamine is used in reaction as catalyst. In the study the influence of catalyst, reaction temperature, NCO/OH mixing ratio and other factors on coating effect had been discussed (U.S. Pat. No. 4,711,659). The patent had used the polyurethane reaction to prepare the controlled-release fertilizer firstly, but in the study the influence of reaction and coating conditions on the nutrition fertilization performance of the polymer coated fertilizer had not been analyzed thoroughly. Furthermore, the active speed of the reaction of the selected raw materials is relatively slow, the reaction temperature is relatively high (100~150° C.), and water resistance of the polyesters is relatively poor, thus its 24 hour water dissolution rate at 100° F. is 7.1%, the controlled releasing performance is not satisfactory, and there was no report of industrial production. The controlled-release fertilizer coated with wearable resin, which is applied for by William P. Moore in 1987, has employed similar ideas, wherein HO— and $NH_2$— are employed as nucleophilic reagent to react with NCO—, which had changed the type of reactants, but the reaction conditions had not been improved, thereby the fertilizer performance of the prepared controlled-release fertilizer had not been changed (U.S. Pat. No. 4,804,403).

In 1994 Alice P. Hudson used the round disc as the coating device, used the reaction of isocyanate (DOW PAPI 94) and hydrogenated castor oil (Union Camp Cenwax G) to prepare controlled-release fertilizer coated with the polyurethane and used paraffin wax (Gulftene C30+, alpha olefin) accounted for 10-50% of the total weight of the reactants to modify the urea surface; the reaction temperature is about 100° C.; hydrogenated castor oil was intermittently added; isocyanate was continuously added; the reactants account for 1~10% of total weight of the coated fertilizer (mainly 1-3%); the effect of NCO/HO disposition and used wax amount on the releasing performance is compared with emphasis; coated controlled-release fertilizer with about 20% releasing for 7 days can be obtained (U.S. Pat. No. 5,538,531). In 1999 Yasuhiro Hirano et al. employed electriferous heater with a diameter of 520 mm and temperature-controlled disk, when the rotational speed reached 20~30 rpm and temperature was 75° C., 2 kg fertilizer particles was placed in. Firstly, 4.1 g MDI (Sumidule 44V10, Bayer) and 5.3 g castor oil (Sumifen™, Bayer), and 0.1 g 2,4,6-tris (dimethylaminoethyl) phenol were used as catalyst, which were sprayed onto the surface of the fertilizer particles for reaction for 3 minutes. This is repeated 16 times and the total coating rate can reach to 8%. Afterwards paraffin wax is added and cooled and solidified into film; the releasing period can be up to about six months (U.S. Pat. No. 6,231,633). In China there are also patents in aspect to the fertilizer coated with polyurethane, wherein the rotating drum was mainly used, reaction materials were added intermittently, and the process of reaction-solidifying is repeated several times. For example, in the rotating drum, materials A, B was dropwised through the nozzle onto the surface of fertilizer particles within the rotating drum to form a coating layer. After reaction and solidifying, then the coating was repeated 2~10 times (CN 101648837A). In addition, the Chinese Patent applied by Ivory Company Limited has introduced the method for producing the fertilizer coated with polyurethane by rotating drum. Its specific operation is: adding 1 kg urea into the rotating drum and heating up to 75° C.; then adding castor oil containing 18% paraffin wax, then adding isocyanate, rotating for 6 minutes, and then repeating the operation steps three times; afterwards removing the heat source, cooling down for 12 minutes until about 30° C., and moving out the test samples. The invention also stressed that adjusting the drum with different rotation rate at different stages of the operation had great impact on product performance.

At present, the method widely used is the method of single dropping for intervals, i.e. reactants are dropped and atomized onto the surface of the fertilizer particles according to the sequential order and the method of adding for intervals. In this way the polyol first added will collide and contact with each other in particle fluidization, to form uniform coating layers. Afterwards, isocyanate is added for reaction to prepare polyurethane film.

In addition, fluidized bed as the coating apparatus generally comprises of a gas distribution chamber, a gas distribution plate, fluidized chamber, enlargement segment, inner components and feed inlet and discharge etc. The structure and inner components vary much depending on the specific process requirement. At present, the devices used in the production of coated fertilizers are mainly Wurster fluidized bed, spouted bed, rotating drum fluidized bed and column style fluidized bed. These devices also have some drawbacks as coating equipment.

Currently polyols used in polyurethane coating reaction are mainly polyols of animal and vegetable fats and partially polyester polyol. Isocyanates used in the reaction are mainly toluene-2,4-diisocyanate (TDI) and diphenylmethane diisocyanate (MDI).

In summary, in the current technological method used in the production of polyurethane coated fertilizers, the reaction material is added intermittently, the operation is relatively complicated and difficult to be carried out automatically and continuously, thus it has some drawbacks:

1. The reaction material is mostly added alone and sequentially. After each reaction monomer is added, a period of time is usually needed to allow its even distribution, thus leading to the disadvantage that reaction material are distributed unevenly and the reaction products are difficult to control;

2. the reaction material is added intermittently and will subject to three phases of uniformly coating, reaction and solidifying for film forming. Especially in the phase of solidifying, viscosity of the polymer will increase in a sudden, therefore the phenomenon of adhesion clusters of the particles is easy to occur, thus interrupting the operation. However strongly stirring the adhesion clusters is easy to destroy the film, thereby the controlled releasing performance is very unstable;

3. In the prior continuous fluidized bed or spouted bed, a number of bed bodies are simply series connected. When the material enters the next bed body from the previous bed bodies, special components plus manual control are needed, which belongs to semi continuous operation. The fluidization phenomenon of the particles is not made full use to make them automatically and gradually flow from one end to the other;

4. Most of the current coating technology are developed from the castoryl polyurethane reaction, therefore the adjustment range of structural performance of the polyurethane products is very limited and controlled releasing performance of the coated fertilizer cannot be improved through controlling the reactants. The isocyanates used in the current patent are mainly TDI and MDI. The former one has great toxicity. The latter one is solid at normal temperature and its chemical properties are easy to change, thus its use is not convenient. However, as the reaction speed is taken into account, MDI is mainly used, which makes MDI addition process very complex.

DETAILED DESCRIPTION

The object of the present invention is to develop a continuous coating method for the reaction material, realize the fact that the reaction materials can be continuously and uniformly added, and no phenomenon of particles conglutination occurs, thereby effectively preventing adhesion and breakage of the particle, realizing continuous feeding and making the reaction process carried out continuously.

The present invention employs one step method to produce controlled-release fertilizer coated with polyurethane, wherein firstly reaction material is mixed rapidly and evenly, and then coated onto the surface of the fertilizer particle. The reaction is promoted to carry out rapidly. Reactants are added and meanwhile the product is formed, which is continuously carried out to continuously form polyurethane film on the surface of the fertilizer particles.

Polyurethane reaction is secondary reaction. The reaction speed increases as the released heat increases. Polyurethane reaction takes place on the surface of the fertilizer particles in the fluidized bed. It involves phases of gas, liquid and solid, and is heterogeneous liquid-liquid reaction occurring on the surface of solid phase. The reactants are liquid phases indiscerptible mutually. The product is liquid phase initially, and is solidified into a solid with cold. The reaction rate and reaction resistance etc. determine the formation rate of the polyurethane product, the degree of reaction and the molecular weight distribution of the product.

In the present invention, a cuboid spouted fluidized bed with a cone bottom and multiple nozzles is also designed, which can not only make the particles fully fluidized, but also can effectively control the backmixing of particles, and not only can guarantee the uniform residence time, but also can make the coating continuously operated, thus providing a continuous coating equipment with strong controllable capability, stable operation and economically feasibility.

Root of variation of the performance and usage of polyurethane reaction product lies in the difference of diisocyanate, polyol and additives used and their processing methods. In general, diisocyanate as hard segments of the polymer chain demonstrates the performance in respect to the strength and polyether polyol as soft segments of the polymer chain mainly demonstrates flexibility. The comprehensive performance of soft segment and hard segments is shown as the glass transition temperature of the polymer, Tg. When Tg<room temperature, the flexibility and elasticity is shown as a whole; when Tg>room temperature, rigidity is shown. Because the molecular weight of the diisocyanate is relatively fixed, the adjustment of it as the hard segment is not strong. While, the molecular weights of the polyester or polyether polyol can differ with up to 10 times (200~8000), therefore they are the emphasis for the adjustment of the properties of polyurethane.

In addition to biobased polyol, there are also a lot of monomer (such as: polyol, polyalcohol, and polyether polyol) all can have polyurethane reaction with isocyanate. In theory polyalcohol (such as polyethylene glycol, PEG) can also have polyurethane reaction with isocyanate to produce the coated fertilizer, but viscosity of the polyalcohol (such as: polyethylene glycol) is high thus it is not very suitable for polyurethane coating. The present invention uses the rigid foam and flexible foam polyether polyol as the reaction monomers. Polyether polyol is better than polyester polyol on water resistance and reaction activity. At present, there are many products series, which can meet the needs of production of various rigid foam and flexible foam, thus providing a broad range of choices.

When the functionality of the polyether polyol is 2, there is no side chains besides the two ends are hydroxyls and the formed product is linear molecule, which demonstrates elasticity and flexibility. As the functionality increases, the number of side chains increases and the polymer molecules is T type, which demonstrates rigidity. Therefore polyether polyol can be selected according to the processing requirements. When polyether polyols of low functionality and high molecular weight is selected, the prepared polyurethane is elastomer; the polyether polyol of high functionality and low molecular weight is selected to prepare the rigid polyurethane material, which can be used for rigid foam polyurethane; the polyether polyol in the middle is selected to prepare the flexible foam polyurethane.

In the polyurethane film forming reaction occurring on the surface of particles, accelerating the reaction speed is generally considered to be beneficial for the processing technology, therefore the controlled-release fertilizer coated with polyurethane needs rigid foam polyether polyol as reactants. In addition, after the polyurethane film is formed, the film is also expected to have certain flexibility to ensure good controlled releaseing performance. Through regulation of the hard segment-soft segment structure of the polyurethane, regulation of controlled releasing performance of coated fertilizer can be achieved.

For this purpose, the present invention employs the following technical solutions:

A method for producing controlled-release fertilizer coated with polyurethane, wherein firstly granular fertilizer is preheated under fluidized state in the fluidized bed; the surface of the granular fertilizer is pretreated after liquid paraffin being atomized; polyol and isocyanate are mixed in a nozzle, then quickly atomized and sprayed onto the surface of the granular fertilizer; the rate of material addition is controlled to make the polyurethane reaction carried out quickly and completely; after the reaction materials are added, liquid paraffin is added for surface release treatment on the granular fertilizer.

The present invention uses a fluidized bed for polyurethane coating to ensure the particles under good fluidized state in the coating process; polyol and isocyanate are mixed in the nozzle chamber and atomized rapidly to ensure the reaction materials conform to the reaction stoichiometry when they reach the surface of the fertilizer particle, thereby the reaction can take place immediately and the time of material coating and evenly mixing can be reduced.

In the present invention, the addition rate of reaction materials is controlled in the spraying process to ensure the just sprayed materials which have not reacted yet only exist on the surface of the particles in the reaction process, while most of them have reacted and solidified.

The fluidized bed is multi-nozzles spouted fluidized bed, which comprises of a cuboid spouted bed body with multiple spouted chambers disposed on the bottom, wherein the bottom of the spray chamber are connected with the air inlet tube respectively with nozzles disposed on the top respectively; baffles are disposed on the top of the spray chamber and between the nozzles.

In order to overcome the design limits of the nozzle diameters and bed height/diameter ratio of the conventional spouted bed, in the present invention, the traditional cylindrical spouted bed body is designed into cuboid column type bed body, wherein the whole bed body is disassembled into several small spouted bed through the differential bottom spout area, while it is an entire structure in the whole.

The core component of the present invention which controls the fluidized state of particles and its residence time lies in the differential design of the spouted fluidized zone at the lower part of the spouted bed body, wherein the present invention differentiates the bottom of the bed body into vertical cone structures and forms several spray chambers. The spouted chamber has a vertical cone structure with large top and small bottom, wherein the upper part of the cone is a square opening and the bottom of the cone is a circular opening. The diameter of the circular opening is in the range of 50~200 mm; the taper is preferably 45°~75°. The number of the spouted chambers is determined by the ratio of length and width L/S of the spouted bed body.

1~2 nozzles are disposed on the top of each spouted chamber respectively. One or more materials from the pipeline of the coating material is compressed, atomized and sprayed onto the surface of particles under fluidized state when entering the nozzle cavity.

The tilt angle of baffle can be adjusted and the tilt angle to the vertical direction is 0°~45°. The inclined baffles can guide the spouted airflow with a lateral velocity, which is beneficial for the particles to enter one spouted chamber when they make fountain motion as passing through the first spouted chamber after entering from the front of the bed body, thereby guiding the particles gradually go through the fluidized bed and effectively controlling of their residence time. Tilt angle of the baffle together with the amount of the fluidized gas and inlet and outlet velocity of the materials can determine the eventual residence time of the particles.

Spouted gas distribution chamber is disposed between the air inlet tube and the spouted chamber; the spouted gas distribution chamber and the spouted chamber are separated with a screen plate or wire mesh; the aperture rate of the screen plate or wire mesh is preferably 50~95%. Under special circumstances, instead of disposing of the gas distribution chamber, the branch pipelines and the circular opening at the bottom of the spouted chamber can be directly connected through flange, wherein the controlled airflow directly enter the spouted chamber.

The top of the spouted bed body is the enlarged section. The enlarged section is divided into three parts. The middle part has a cuboid column-shaped structure, with a length of L, a width of 2S and a height of 1~2S; the lower part has a square platform structure, wherein the upper opening of the square platform is connected with the middle part (2S for width, L for length), the lower opening is connected with the spouted bed body. (S for width, L for length), and the height of the platform body is 1~1.5S; the upper part has a cone structure with naturally transition and drawing in, wherein the lower opening is connected with the middle part (2S for width, L for length), the upper bottom is a closed surface with a width of S and a length of L/2, the height is 1~1.5S and multiple air vent are disposed on the upper opening.

The front end of the spouted bed body is disposed with feed inlet, which receives the material from the hoist delivery. The side of the last spouted chamber in the back end is disposed with feed discharge.

The multi-nozzles spouted fluidized bed is disposed with a number of rows of cuboid bed bodies along the width direction of the spouted bed body, wherein the bed bodies of each row are connected end to end to form array arrangement entirety, or single rows are connected end to end to form annular arrangement entirety.

The polyol is polyether polyol, which has a hydroxyl value of 100~415 mgKOH/g, a molecular weight of 400~1700 and a functionality of 2~4. The hydroxyl value of the polyether polyol can be the values such as:
100±10 mgKOH/g, 107~117 mgKOH/g, 115~130 mgKOH/g,
120~140 mgKOH/g, 163~173 mgKOH/g, 230~250 mgKOH/g,
265~295 mgKOH/g, 280~340 mgKOH/g, 300~360 mgKOH/g,
350~370 mgKOH/g, 365~395 mgKOH/g or 380~420 mgKOH/g etc.
Functionality of the polyether polyol of between 2~4 can guarantee the film has certain toughness and strength.

Preferably, the polyether polyol includes rigid foam polyether polyols with hydroxyl value of 200~300 mgKOH/g and flexible foam polyether polyols with hydroxyl value of 100~200 mgKOH/g; the mass ratio of the rigid foam polyether polyols and the flexible foam polyether polyol is preferably 10:90~90:10, such as 11:89, 12:88, 15:85, 20:80, 25:75, 30:70 50:50, 60:40, 40:60, 70:30, 80:20, 85:15, 88:12, 87:13, or 89:11 etc.

Preferably, the polyether polyol also includes the block copolymer polyether polyol resulted from copolymerization of ethylene oxide and/or propylene oxide with polyol; preferably, the functionality of the block copolymer polyether polyol is 3~4; preferably, the molecular weight of the block copolymer polyether polyol is 800~1200, more preferably 900~1100, particularly preferably 1000; preferably, the content of the block copolymer polyether polyol in the polyether polyol is 5~50 wt %, more preferably 8~40 wt %, particularly preferably 10~30 wt %; the polyol is the one such as propylene glycol, glycerin or diethylene glycol etc.

Preferably, the polyether polyol includes the rigid foam polyether polyol with a functionality of 2~4 and a hydroxyl value of 200~300 mgKOH/g, flexible foam polyether polyols with a functionality of 2~4 and hydroxyl value of 100~200 mgKOH/g, and the block copolymer polyether polyol resulted from copolymerization of ethylene oxide and/or propylene oxide with polyols, which has a molecular weight of 800~1200, a functionality of 3~4; the mass ratio of the rigid foam polyether polyol and the flexible foam polyether polyol is 10:90~90:10; the content of the block copolymer polyether polyol in the polyether polyol is 5~50 wt %.

Preferably, the isocyanate is liquefied MDI and/or PAPI, particularly preferably PAPI. The liquefied MDI has an alias of modified MDI, a English name of modified MDI or liquified MDI, wherein compatible impurities are introduced, thus crystallinity of the product is changed and the crystals are eliminated at room temperature; MDI is diphenylmethane diisocyanate, and PAPI is polyaryl polymethylene isocyanate.

Preferably, in the production method, catalyst is added in the polyol in advance; preferably, the catalyst is one or a mixture of at least two selected from a group of stannous octoate, dibutyltin dilaurate or tetramethyl diaminobutane. Adding catalyst in polyol in advance can greatly improve the reaction speed, shorten the time of reaction and solidifying, make the reaction complete instantly after the materials are sprayed onto the surface of the fertilizer particles, and further guarantee the continuous reaction operation.

The preheating temperature is 75~95° C., more preferably 80~90° C., particularly preferably 85° C.

The preheating time is at least 1 minute, particularly preferably 2 minutes.

The pretreatment time is 1~5 minutes, more preferably 1.5~3 minutes, particularly preferably 2 minutes.

The mass ratio of the granular fertilizer and paraffin is 100:1~200:1, more preferably 130:1~180:1, particularly preferably 150:1.

The spraying velocity is 0.5~6 g/min, more preferably 1~4 g/min, particularly preferably 3 g/min.

The spraying time is 10~25 minutes, more preferably 12~20 minutes, particularly preferably 15 minutes.

In the production method of the present invention, peristaltic pump is used for slow addition of reaction material to control the addition rate. The method can realize the continuous addition of the reaction materials. The skilled in the art can choose addition rate according to the needs of the process.

In the present invention liquid paraffin is used and directly sprayed at room temperature, thus being more convenient when compared with the prior art wherein the solid paraffin can be sprayed after being melted.

In the present invention, the fluidized bed is used as the coating equipment, the polyol and the isocyanate are premixed or prepolymerized and then sprayed for coating, and adjustment of the addition speed of the reaction materials is coordinated, thus making the whole coating process carried out rapidly and continuously. Compared with the prior art, the present invention has the advantages of:

1. In the present invention, the multi-nozzles spouted fluidized bed makes full use of the phenomenon of particle fluidization and concentrate the advantages of the spouted bed into one entirety thus having compact structure and simple control. The inner structure of the device can effectively control backmixing and residence time of the particles in the process of coating and solve the issues such as poor fluidization of the rotating drum fluidized bed, particle collision impacting quality of film, and low capacity of batch type fluidized bed or spouted bed.

2. In the present invention, polyether polyol and isocyanate (especially PAPI) are used as reaction materials, the proportion of reaction materials is designed according to the requirement of controlled releasing film on the strength and toughness of the polyurethane products, and rigid foam polyether polyols with different molecular weight are selected and combined into specific coating materials. Compared with the prior coating reaction materials, the reaction materials of the present invention has small molecular weight and fast reaction speed, polyether polyol has high functionality, the prepared polyurethane product has high strength and excellent toughness and the molecular chain of the polyurethane has different flexible and rigid segments resulted from mixture of different polyols, which can improve its strength and toughness and solve the issues that animals and plants oil based polyols is poorly adjustable in polyurethane reaction process and cannot satisfy the production and usage;

3. The fluidized bed can make particles under good fluidized state thereby greatly shortening the probability and time of particle contacts; reaction materials has been evenly mixed when arriving at the surface of the fertilizer particles, thereby shortening the time of distribution and reaction; the addition rate of reaction materials is controlled to ensure that most of the reaction materials in fluidized bed has been completed reaction and solidifying and eliminate the particles wholly adhering phenomenon induced by intensive solidification; spraying liquid paraffin after completion of the reaction can effectively prevent products to be moistened and bonding when stacked.

The present invention can improve the efficiency of polyurethane coating operation to a greater extent, and the quality of the coated fertilizer is more stable and reliable due to the continuous reaction.

Figure 1:
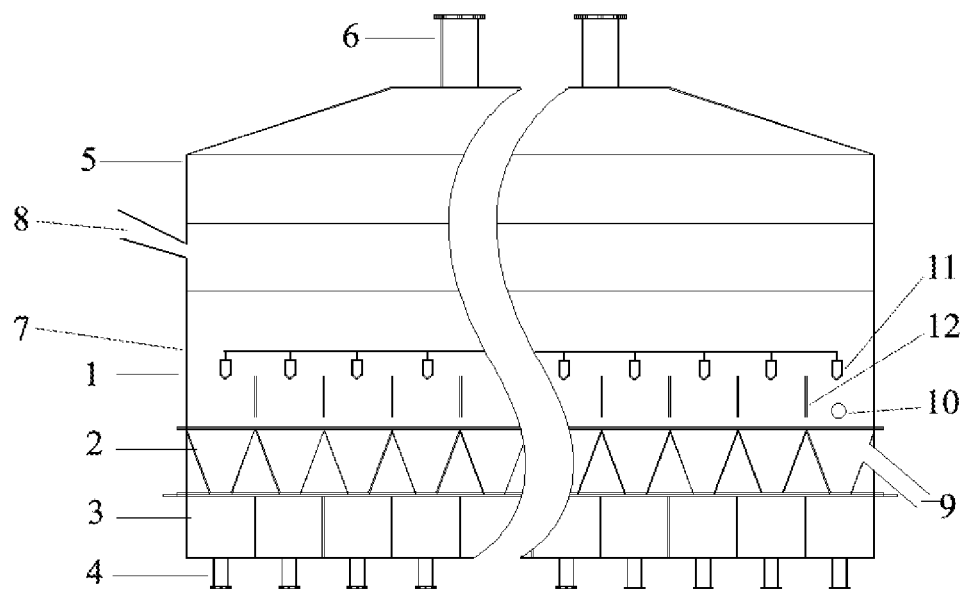
FIG. 1 is a front view schematic diagram of the multi-nozzles spouted fluidized bed of the present invention.

In Figure: 1—spouted bed body; 2—spouted chamber; 3—spouted gas distribution chamber; 4—air inlet tube; 5—enlarged segment; 6—air vent; 7—human aperture; 8—feed inlet; 9—feed discharge; 10—observation opening 11—nozzle; 12—baffle plate.

The present invention is further described in details in the following. But the following embodiments are only simple examples of the present invention, and do not represent or limit the scope of rights protection of the present invention. The scope of protection of the present invention should take the claims as standard.

EXEMPLARY EMBODIMENTS

For better illustrating the present invention and understanding of the technical solution of the present invention, the typical but non-limiting embodiments of the present invention are described in the following:

Example 1

Experiment of Continuously Spraying Reaction Materials for Coating

The following is the coating operation method and steps: firstly, adjusting coating parameter with a fluidized gas volume of 200 m³/h, a compressed air pressure of 0.2 MPa, gas volume of 200 L/h and a fluidized gas temperature of 85° C.; secondly, weighing 1.5 kg of large granular urea, adding it through air outlet and preheating for 2 min; then, spraying 10 g of liquid paraffin in and pretreating urea with treatment time of 2 min; fourthly, weighing about 12 g of PAPI and 30 g of polyether polyol (hydroxyl value is 160-170) in accordance with the mole ratio of isocyanate and polyol of 1.1:1, adding into the nozzles with peristaltic pumps in the speed of 0.4 g PAPI/min and 1 g polyether polyol/min, and spraying for coating through the nozzles; fifthly, spraying 10 g of liquid paraffin in after the reaction materials are added, and moving out the samples after 2 min, then the experiment is finished.

The whole coating process takes half an hour to finish. In the coating process, no solidification adhesion occurs. The coating product is measured for releasing performance with the method of water immersion.

Example 2

The Impact of the Addition Modes of Reaction Materials on the Coating Operation

In order to examine the impact of the coating operation modes of rapid spraying (mixed spraying) after external mixing on the coating operation, the investigation has used several different addition modes to compare the effect of addition modes on coating operation and fertilizer releasing performance.

The addition modes of reaction materials includes: dripping sequentially in an intermittent mode, dripping simultaneously in an intermittent mode, dripping simultaneously in a continuous mode, spraying simultaneously in a continuous mode, rapid spraying after external mixing (same with example 1), and spraying after pre-polymerizing, six treatment solutions in total. The experimental conditions and the controlled parameters are same with example 1. The experimental sample obtained is measured for the releasing performance with the method of water immersion. The experimental results as shown in table 1.

Shown in Table 1: in the operation in an intermittent mode, the reaction material is adding centrally and the reactions are carried out in batches. In the whole process, there exists the phenomenon of fluidized deterioration resulted from reaction solidification and the risk of particles adhesion clusters. In the use of polyurethane pre-polymer for coating, the polyurethane reaction will lead to nozzle clogging thus making the reaction materials cannot be further added. In the dripping in a continuous mode, along with the reaction proceeding, fluidized deterioration phenomenon occurs and the risk of particles adhesion clusters is large. In spraying Individually in a continuous mode and external mixed spraying, coating operation can be carried out persistently. In regard of releasing performance, atomization can make materials distributed more evenly, therefore its early dissolution rate is low, and the releasing time is the longest. The time for accumulative 80% releasing of the external mixed spraying treatment is the longest as 65 days and that of the individually spraying in a continuous mode is second longest as 51 days; while in other operations, releasing time is shortened due to the influence of adhesion phenomenon. The releasing time of the dripping simultaneously in an intermittent mode is half of that of external mixed spraying treatment.

Example 3

The impact of external mixed spraying treatment on different polyurethane coating reaction. The process conditions same with that in example 1 is employed, the reaction materials is added in the coating method of external mixed spraying and the reaction and coating of three kinds of polyol with hydroxyl values of 415, 163 and 55, and isocyanate (PAPI) is compared. The coated samples are measured for releasing rate with the method of water immersion, the result of which is shown in Table 2.

TABLE 1

The impact of the addition modes of reaction materials on the operation and performance of coating

| No. | Addition modes | Early dissolution rate | Differential dissolution rate | Releasing time | Note |
|---|---|---|---|---|---|
| 1 | dripping sequentially in an intermittent mode | 2.1% | 1.56% | 50 | particles fluidized deteriorateion phenomenon intermittently |
| 2 | dripping simultaneously in an intermittent mode | 2.3% | 2.22% | 35 | particles fluidized deteriorateion phenomenon intermittently |
| 3 | dripping simultaneously in a continuous mode | 2% | 1.86% | 42 | difficult in late particle fluidization |
| 4 | spraying individually in a continuous mode | 1% | 1.55% | 51 | normal reaction |
| 5 | external mixed spraying | 0.4% | 1.22% | 65 | normal reaction |
| 6 | spraying after pre-polymerizing | — | — | — | nozzle clogging, operation is interrupted |

TABLE 2

The effect of the external mixed spraying treatment on the different polyurethane coating reactions

| No. | Hydroxyl values of polyol | Early dissolution rate | Differential dissolution rate | Releasing time | Note |
|---|---|---|---|---|---|
| 1 | 415 | 0.8% | 1.76% | 45 | Coating is normal |
| 2 | 163 | 0.4% | 1.22% | 65 | Coating is normal |
| 3 | 110 | 0.2% | 1.16% | 69 | Coating is normal |

The rate of the reaction of the polyols with different hydroxyl values and PAPI differs much. 3 types of polyols with different hydroxyl values are tested in the present experiment. According to the result of the experiment, in No. 1 treatment, the fluidized state of the whole process is the best. Therefore as the polyurethane coating, it can improve the reaction speed of the reactants, reduce the process requirement of coating operation and make the coating operation easy to control. In regard of the releasing time, No. 3 treatment has the longest releasing time, which is related with the performance of the polyurethane reaction products.

Example 4

Figure 2:
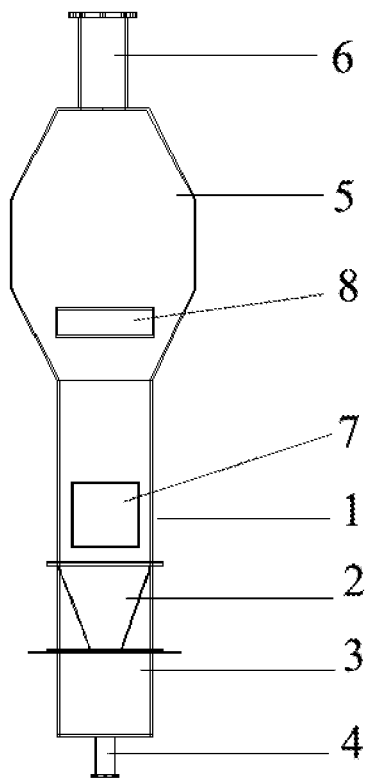
FIG. 2 is a side view schematic diagram of the multi-nozzles spouted fluidized bed of the present invention.

As shown in FIG. 1 and FIG. 2, a multi-nozzles spouted bed used for continuous production of controlled-release coated fertilizer, comprising of a cuboid spouted bed body 1, the bottom of which is disposed with multiple spouted chamber 2; the bottom of the spouted chamber 2 is connected with air inlet tube 4 respectively and the top of it is disposed with a nozzle 11 respectively; a baffle 12 is disposed on the top of the spouted chamber 2, and between each nozzle 11.

The spouted chamber 2 has a vertical cone structure, in which the top is large and the bottom is small, the upper part of the cone is a square opening and the bottom of the cone is a circular opening; the taper is preferably 45°~75°; the diameter of the circular opening is preferably in the range of 50~200 mm.

The length, width and height of the spouted bed body are L, S, H respectively; S is 200~800 mm, the ratio of height and width H/S is 2~4 and the ratio of length and width L/S is 5~100.

The top of each spouted chamber 2 are disposed with 1 to 2 nozzles 11. The inclination angle of the baffle 12 to the vertical direction is 0°~45°.

The spouted gas distribution chamber 3 is disposed between the air inlet tube 4 and the spouting chamber 2; The spouted gas distribution chamber 3 and the spouted chamber 2 are separated with screen plate or wire mesh; the aperture rate of the screen plate or the wire mesh is preferably 50~95%.

The top of the spouted bed body 1 is an enlarged section 5; the enlarged section 5 is divided into three parts, wherein the middle part has a cuboid column-shaped structure; the lower part has a square platform structure, the lower opening of which is connected with the spouted bed body 1; the upper part is a cone structure, the upper opening of which is disposed with a number of air vents 6.

The air vent 6 is connected with the main air vent through the pipelines and enters the cyclone dust cleaning equipment; connection part between the air vent 6 and the pipeline is disposed with a wire mesh less than 16 meshes.

The front of the spouted bed body is disposed with human aperture 7, which has a square structure. The top of the human aperture 7 is disposed with feed inlet 8. The side of the last spouted chamber at the latter part of the spouted bed body is disposed with feed discharge 9. The two sides of the spouted bed body is disposed with observation opening 10 at the part close to the spouted chamber.

The spouted bed is disposed with a number of rows of cuboid bed bodies along the width direction of the spouted bed body 1, and bed bodies of each row are connected end to end to form array arrangement entirety, or single rows are connected end to end to form annular arrangement entirety.

The above equipment is used and large granule urea with two colors (white and green) is employed. The device is used to carry out the cold state experiment, wherein the residence time and mixing characteristics of the particles in the process of continuous operation of the device is investigated. The experiment is carried out at room temperature, wherein the velocity of the spouted airflow is set to 200 $m^3$/h, the compression pressure is 0.2 MPa, flow rate is 120 L/h and the fluidized bed is under the working state. Then the white large granular urea is added gradually at a rate of 2 kg/min from the feed inlet. As addition, flowing situation of the particles is recorded. When the last spouted chamber is full of the white particles, the green large granular urea is begun to be replaced with white ones. After addition, sample is taken every 1 minute, for 5 times in total. The result of the experiment is shown in Table 3.

TABLE 3

Table for the distribution of particles replacement amount in the spouted bed

| Sampling time | Sampling opening 1 | Sampling opening 2 | Sampling opening 3 | Sampling opening 4 | Sampling opening 5 |
|---|---|---|---|---|---|
| 1 | 22% | 3% | 2% | 1% | 0 |
| 2 | 38% | 25% | 19% | 16% | 10% |
| 3 | 59% | 35% | 29% | 25% | 23% |
| 4 | 73% | 52% | 43% | 37% | 32% |
| 5 | 91% | 75% | 61% | 54% | 41% |

As shown in Table 3, when the green particles are added into the spouted bed at a speed of 2 kg/min, the replacement situation of the first spouted chamber is: during the first minute of sampling, 22% is replaced; along with the continuous addition of green particles, the replacement ratio escalates to 38%, 59%, 73%, 91%, from which it can be concluded that along with the gradual addition of the new particles, the particles in the spouted chamber is gradually replaced by the newly added particles and the replacement speed is positive correlated with time. The second spouted chamber has similar situation, which lag of about one minute as a whole compared with the first spouted chamber. In comparison, in the third spouted chamber, mixing is enhanced, replacement speed is slower, but replacing speed and time are still positively correlated. The conclusion with the fourth and the fifth spouted chamber is consistent with that the third spouted chamber is. In addition, during the first minute of sampling, certain percentage of green particles will appear in the second spouted chamber and similarly small amount of green particles also appear in the third and fourth spouted chambers, which suggests that a small portion of particles will quickly pass through the spouted bed. Therefore, rapid material addition rate should not be employed for this kind of fluidized bed and in order to ensure the uniformity of mixing, the residence time of particles in the bed should be relatively long.

In order to optimize the particle distribution, modification of experimental parameters is made. Firstly the spouted airflow rate is adjusted to 150 m$^3$/h, the compression pressure is 0.2 MPa, flow rate is 80 L/h and the bed is made under the working state. Then the white large granular urea is gradually added at a rate of 1 kg/min from the feed inlet and the fluidized state of the particles is close to the peristaltic fluidization. The experimental results are shown in Table 4.

TABLE 4 the distribution of particles replacement amount in the spouted bed in the optimization experiment

| Sampling time | Sampling opening 1 | Sampling opening 2 | Sampling opening 3 | Sampling opening 4 | Sampling opening 5 |
|---|---|---|---|---|---|
| 2 | 21% | 2% | 0.5% | 0 | 0 |
| 4 | 39% | 23% | 3% | 1% | 0 |
| 6 | 56% | 40% | 26% | 6% | 2% |
| 8 | 78% | 59% | 47% | 31% | 32% |
| 10 | 94% | 81% | 68% | 52% | 44% |

After the fluidizing air volume and compressed air volume is reduced, the flowing state of the particles is weakened and moreover the velocity of particles addition is reduced, thus the speed of particle passing from one chamber into the next chamber obviously slows down. In the first spouted chamber, at the 2, 4, 6, 8, 10 minutes of sampling (the mean residence time of the particle is 10 minutes), the percentages of the green particle distribution are 21%, 39%, 56%, 78%, 94%. Using linear regression, the relationship between the percentage of the green particles with sampling time: y=0.0954x, r=0.998, which illustrates the replacement quantity is proportional with the time. The other spouted chambers are presented with the similar rule, and the correlation coefficients are also higher.

Example 5

The impact of different polyether polyol on the coating operation and effect. In order to make polyether polyols with different functionality and different hydroxyl value to react with PAPI respectively to prepare the coated controlled-release fertilizer, the treatment solution and results are shown in Table 5.

TABLE 5

The coating treatment solution of different polyether polyol and the releasing performance of the samples

| No. | Functionality | Hydroxyl value of the polyol (mgKOH/g) | Early Dissolution Rate | Differential dissolution rate | Releasing Time (day) |
|---|---|---|---|---|---|
| 1 | 3 | 410 | 0.2% | 1.81% | 45 |
| 2 | 3 | 110 | 0.5% | 1.12% | 72 |
| 3 | 3 | 55 | 6% | 12.3% | 7 |
| 4 | 2.7 | 163 | 0.6% | 1.32% | 61 |
| 5 | 2 | 280 | 1% | 3.04% | 27 |
| 6 | 2 | 110 | 2% | 2.89% | 28 |
| 7 | 2 | 55 | 14% | 33% | 3 |

As shown in Table 5, the hydroxyl value and the functionality of polyether polyols have a great impact on the nutrient releasing performance of the coated fertilizer. The polyurethane coated fertilizer prepared with the rigid foam polyether polyol or the polyether polyol with a hydroxyl value in the range of 100~200 mgKOH/g has better releasing performance. When the functionality is 2, the nutrition releasing time of the prepared coated fertilizer is generally short. In the water immersion test, it can be seen that the film of the polyurethane coated fertilizer with a functionality of 2 was spherical under the seepage pressure of water. In other word, under the seepage pressure of water, the film is flexible and easy to deform thereby resulting in nutrient rapid releasing; when the functionality is 3, the controlled releasing performance of the prepared coated controlled-release fertilizer is greatly improved, and the one with a hydroxyl value of 110 mgKOH/g has the best treatment result. Therefore guaranteeing the film has certain strength and flexibility is very important for improving the mechanical properties of the layer structure. The two treatments with a hydroxyl value of 55 and functionality of 2 and 3 have very poor releasing performance, which demonstrates that rigid foam polyether polyol should be selected for the preparation of controlled-release fertilizer coated with polyurethane. In regard of coating operation process, in the treatment with a hydroxyl value of 55, the reaction speed is slow and adhesion phenomenon is easy to occur. Therefore, the rigid foam polyether polyol is required to be used, no matter in the aspect of increasing the reaction rate, or for the controlled releasing performance.

Example 6

The impact of adjusting the composition and ratio of flexible and rigid segment of rigid foam on the coating operation and effect. As shown in Example 5, the rigid foam with a hydroxyl value of 415 has the fastest reaction speed, but its controlled releasing performance is not the best, because the strength of the film is too large and lack of a certain elasticity thus under the seepage pressure of water it is easy to rupture and lead to leakage and rapid release. For this, in the present example, the composition and ratio of flexible and hard segments of the rigid foam is adjusted, wherein the polyols with a functionality of 3 is used for mixing and the block copolymer polyether polyols is used for coating treatment (as in Table 6). The polyether block copolymer used in the experiment is the ethylene oxide-propylene oxide copolyether, specifically with a EO/PO ratio of 1/2.5. The normal pressure synthesis method is employed for preparation. The central block is propylene oxide-ethylene oxide-propylene oxide three block copolyether with ethylene oxide units.

TABLE 6

The impact of adjusting composition and ratio of soft and rigid sements of the rigid foam on the coating operation and effect

| No. | hydroxyl value 110 ratio | hydroxyl value 410 ratio | Early dissolution rate | Differential dissolution rate | Releasing time (day) |
|---|---|---|---|---|---|
| 1 | 0 | 100% | 0.2% | 1.81% | 45 |
| 2 | 20% | 80% | 0.5% | 1.53% | 53 |
| 3 | 40% | 60% | 0.4% | 1.21% | 67 |
| 4 | 60% | 40% | 0.1% | 0.94% | 86 |
| 5 | 80% | 20% | 0.2% | 1.00% | 81 |
| 6 | 100% | 0 | 0.5% | 1.12% | 72 |
| 7 | block copolymer polyether polyols | | 0.3% | 0.97% | 83 |

As demonstrated by the data in Table 6, when the method of blending the block copolymer, the nutrition releasing performance of the coated fertilizer can be improved effectively, especially when the flexible foam polyether polyols with a hydroxyl value of 110 accounted for 60%, and the rigid foam polyether polyols with a hydroxyl value of 410 accounted for 40%, the releasing time is longest, close to 3 months.

Example 7

Specific production process is as following:
(1) Roots blower is opened. After the airflow is buffered and balanced through the buffer tank, it will subject to heating by the electric heater and then enter the multi-nozzles spouted fluidized bed. The temperature within the fluidized bed is guaranteed at 75° C., to make the fluidized bed in the working state.
(2) 2 kg of large granule urea is added into the fluidized bed for 10 minutes of preheating. Then the use compressed air provided by the air compressor is made pass through the nozzle. 10 g of liquid paraffin placed in the storage tank is sprayed into the fluidized bed and the surface of the urea particle is pretreated with a processing time of 5 minutes.
(3) In the storage tank, polyether polyol, tetramethyl diaminobutane and cyclopentane are added according to stoichiometry, mixed evenly, and delivered to the nozzle with a peristaltic pump. At the same time, PAPI is added in the storage tank, delivered to the nozzle by a peristaltic pump, and rapidly mixed with the reaction materials in the storage tank in the nozzle before atomization, wherein, the polyether polyol contains 50 wt % polyether polyol with a hydroxyl value of 200 mgKOH/g and a molecular weight of 400~600 and a functionality of 3, and 50 wt % block copolymer of polyether polyols resulted from copolymerization of ethylene oxide/propylene oxide and propanediol. The block copolymer of polyether polyols has a molecular weight of 800, and a functionality of 3.
(4) The reaction materials are atomized at a speed of 0.5 g/min. After 25 minutes operation, addition of reaction material is stopped, coating is ended and the coated sample is taken out.
By testing, the controlled-release fertilizer coated with polyurethane obtained in the present example has an early dissolution rate of 1.1%, differential dissolution rate of 1.32% and releasing time of 61 days.

Example 8

Specific production process is as following:
(1) Roots blower is opened. After the airflow is buffered and balanced through the buffer tank, it will subject to heating by the electric heater and then enter the multi-nozzles spouted fluidized bed. The temperature within the fluidized bed is guaranteed at 95° C., to make the fluidized bed in the working state.
(2) 1 kg of large granule urea is added into the fluidized bed for 1 minutes of preheating. Then the compressed air provided by the air compressor is made pass through the nozzle. 10 g of liquid paraffin placed in the storage tank is sprayed into the fluidized bed and the surface of the urea particle is pretreated with a processing time of 1 minutes.
(3) In the storage tank, polyether polyol, trimethylene diamine and HFC are added according to stoichiometry, mixed evenly, and delivered to the nozzle with a peristaltic pump. At the same time, MDI is added in the storage tank, delivered to the nozzle by a peristaltic pump, and rapidly mixed with the reaction materials in the storage tank in the nozzle before atomization, wherein, the polyether polyol contains 95 wt % polyether polyol with a hydroxyl value of 150 mgKOH/g and a molecular weight of 1200~1700 and a functionality of 3, and 5 wt % block copolymer of polyether polyols resulted from copolymerization of epoxy propane and propanediol. The block copolymer of polyether polyols has a molecular weight of 1200, and a functionality of 4.
(4) The reaction materials are atomized at a speed of 6 g/min. After 10 minutes operation, addition of reaction material is stopped, coating is ended and the coated sample is taken out.
By testing, the controlled-release fertilizer coated with polyurethane obtained in the present example has an early dissolution rate of 0.2%, differential dissolution rate of 0.93% and releasing time of 87 days.

The applicant stated that the present invention employs the examples above to describe the production method of the present invention, but the present invention is not limited to the operation steps above, i.e. it does not mean that the present invention must rely on the operation steps above to be implemented. The skilled in the art should understand, any improvement of the present invention, the equivalent replacement to the raw materials of the present invention product, adding auxiliary ingredients, specific mode selection, etc. all fall within the protection scope and disclosure scope of the present invention.

The invention claimed is:
1. A method for producing controlled-release fertilizer coated with polyurethane, wherein
preheating granular fertilizer in a fluidized state in a fluidized bed;
pretreating a surface of the granular fertilizer with atomized liquid paraffin;
forming a mixture of polyol and isocyanate in a nozzle;
atomizing and spraying the mixture of the polyol and the isocyanate onto the pretreated granular fertilizer; wherein the polyol and the isocyanate addition to the nozzle is controlled at a rate sufficient to complete a polyurethane reaction of the polyol and the isocyanate; and
applying a liquid paraffin surface release treatment on the polyurethane coated fertilizer;
wherein the fluidized bed is a multi-nozzle spouted fluidized bed comprising a cuboid spouted bed body, the bottom of which is disposed with a number of spouted chambers; the bottom of the spouted chamber is connected with the air inlet tube respectively and its top is disposed with the nozzles respectively; and baffles are disposed on the top of the spouted chamber, and between the nozzles;
wherein the polyol is a polyether polyol; comprising:
rigid foam polyether polyol with a functionality of about 2 to about 4 and a hydroxyl value of about 200 mgKOH/g to about 300 mgKOH/g;

flexible foam polyether polyol with a functionality of about 2 to about 4, a hydroxyl value of about 100 to about 200 mgKOH/g; and block copolymer polyether polyol having a molecular weight of about 800 to about 1200 and a functionality of about 3 to about 4;

wherein the mass ratio of the rigid foam polyether polyol to the flexible foam polyether polyol is about 10:90 to about 90:10; and wherein the content of the block copolymer polyether polyol in the polyether polyol is about 5 wt % to about 50 wt %.

2. The method according to claim 1, wherein the spouted chamber has a vertical cone structure, in which the top is large and the bottom is small, the upper part of the cone is a square opening and the bottom of the cone is a circular opening; the taper is about 45° to about 75°; the diameter of the circular opening is in the range of about 50 mm to about 200 mm; one or more nozzles are disposed on the top of each spouted chamber respectively; the inclination angle of the baffle to the vertical direction is about 0° to about 45°; the spouted gas distribution chamber is disposed between the air inlet tube and spouted chamber.

3. The method according to claim 1, wherein the top of the spouted bed body is an enlarged section; the enlarged section is divided into three parts, wherein the middle part has a cuboid column-shaped structure; the lower part has a square platform structure, the lower opening of which is connected with the spouted bed body; the upper part is a cone structure, the upper opening of which is disposed with a number of air vents; the front of the spouted bed body is disposed with feed inlet; the side of the last spouted chamber in the back end is disposed with feed discharge.

4. The method according to claim 1, wherein the multi-nozzles spouted fluidized bed is disposed with a number of rows of cuboid bed bodies along the width direction of the spouted bed body, and bed bodies of each row are connected end to end to form array arrangement entirety, or single rows are connected end to end to form annular arrangement entirety.

5. The method according to claim 1, wherein the isocyanate is liquefied MDI and/or PAPI.

6. The method according to claim 1, wherein the isocyanate is PAPI.

7. The method according to claim 1, wherein in the production method catalyst is added into the polyol in advance; the catalyst is one or a mixture of at least two selected from the group consisting of stannous octoate, dibutyltin dilaurate and tetramethyl diaminobutane.

8. The method according to claim 1, wherein the preheating temperature is about 75° C. to about 95° C.

9. The method according to claim 1, wherein the preheating time is at least 1 minute.

10. The method according to claim 1, wherein the pretreatment time is about 1 minute to about 5 minutes.

11. The method according to claim 1, wherein the mass ratio of the granular fertilizer and liquid paraffin is about 100:1 to about 200:1.

12. The method according to claim 1, wherein the spray rate is about 0.5 g/min to about 6 g/min.

13. The method according to claim 1, wherein the spray time is about 10 minutes to about 25 minutes.

* * * * *